United States Patent [19]  
Stahl

[11] 3,909,156  
[45] Sept. 30, 1975

[54] GAS TURBINE HAVING EXHAUST BEARING SUPPORT STRUTS
[75] Inventor: William F. Stahl, Media, Pa.
[73] Assignee: Westinghouse Electric Corporation, Pittsburgh, Pa.
[22] Filed: Feb. 28, 1974
[21] Appl. No.: 447,181

[52] U.S. Cl. ............. 415/142; 60/39.31; 60/39.32; 308/28; 308/32
[51] Int. Cl.² ..................... F01D 25/16; F02C 7/20
[58] Field of Search .... 60/39.32, 39.31, 271, 39.75, 60/39.5; 415/219 R, 209, 142, 99, 103; 138/37; 239/265.11, 265.39; 308/26, 27, 28, 29, 32

[56] References Cited
UNITED STATES PATENTS

| | | | |
|---|---|---|---|
| 2,651,172 | 9/1953 | Kennedy | 239/265.37 X |
| 2,655,307 | 10/1953 | Buckland et al. | 415/209 |
| 2,852,917 | 9/1958 | French | 60/39.75 |
| 2,933,893 | 4/1960 | Blyth et al. | 60/39.32 X |
| 3,117,826 | 1/1964 | Hampton | 415/181 |
| 3,359,646 | 12/1967 | Beachler | 308/29 |

Primary Examiner—William L. Freeh  
Assistant Examiner—Thomas I. Ross  
Attorney, Agent, or Firm—G. H. Telfer

[57] ABSTRACT

A gas turbine exhaust bearing, disposed about the downstream end of a turbine shaft, is supported by four obliquely disposed elongated support struts. The struts extend between the bearing and corners of a square frame on the downstream end of the turbine. The square frame is disposed downstream of the exhaust bearing. The struts are slightly yieldable, to permit their thermal elongation relative to the square frame, and to maintain concentricity of the bearing and shaft with respect to the turbine.

5 Claims, 3 Drawing Figures

GAS TURBINE HAVING EXHAUST BEARING SUPPORT STRUTS

BACKGROUND OF THE INVENTION

1. Field of the Invention

This invention relates generally to gas turbines, and more particularly to support members for gas turbine exhaust bearings.

2. Description of the Prior Art

Gas turbine exhaust bearings rotatively support the downstream or exhaust end of the turbine shaft. This bearing is usually disposed within the hot exhaust gas flow path. Therefore, the bearing must be supported by members which extend across the hot exhaust gas flow-path. The thermal stresses and thermal expansion occurring within these support members, as well as in the shaft and bearing itself, are very high. Present gas turbines have support members that extend radially outwardly from the bearing to the casing, all of the support members lying on a single plane. This type of support causes high stresses from thermal expansion within the support members and the shaft. Another type of bearing support in present use comprises struts extending tangentially from the outer periphery of the bearing to the outer turbine casing or frame. This type of support is bulky for shipping purposes. It also fails to provide the direct, expandable support necessary for maintaining bearing and shaft concentricity.

SUMMARY OF THE INVENTION

According to the present invention, four generally airfoil shaped struts are obliquely disposed between an exhaust bearing for a shaft on a gas turbine, and corners of a generally square-shaped frame disposed on the downstream end of the gas turbine. The frame is axially downstream of the bearing. The shaft, frame, and components near the hot exhaust gases react to thermal changes by expanding or contracting with respect to temperature increases or decreases. The elongated length of the air-foil shaped struts permit a slight yielding or flexibility therein when subject to loads due to axial elongation of the shaft. A square frame permits longer struts since they may extend from the corners of the square. The longer struts provide a greater adaptability to thermal changes.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 1:
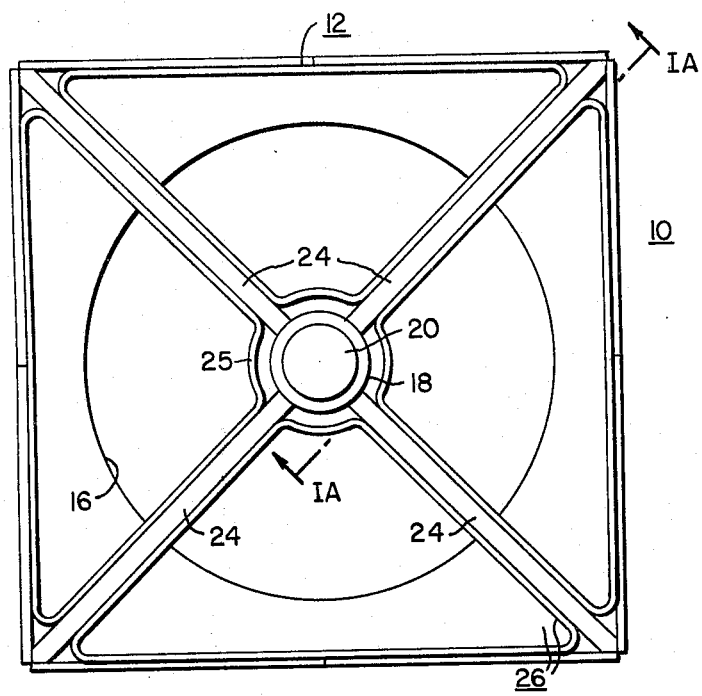
FIG. 1 shows an axially direct view of an exhaust bearing support arrangement constructed in accordance with this invention.
Figure 2:
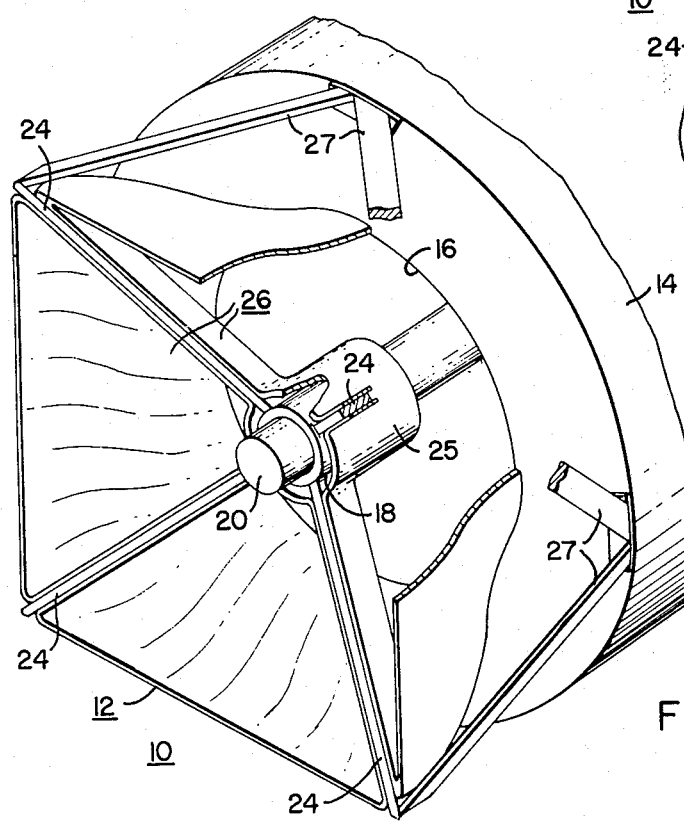
FIG. 2 is a perspective view of a gas turbine exhaust bearing support arrangement constructed in accordance with this invention.

Referring to the drawings in detail, and particularly to FIG. 1, in an axially directed view there is shown the downstream end of a gas turbine 10. The gas turbine 10 exhaust portion includes an outer generally square-shaped frame 12 disposed adjacent and connected to a generally cylindrical outer turbine casing 14, which is shown in FIG. 2, an annular exhaust area 16, a bearing member 18 disposed about a rotatable shaft 20, four angularly directed or oblique struts 24 to support the bearing member 18 and a cowling 25 to give the exhaust gases passing around the bearing 18 and struts 24 a smooth aerodynamic flow.

The struts 24 are within a part of a fairing arrangement 26 which reduces fluid drag over the members of the turbine exhaust structure. The square shaped frame 12 is secured to the casing 14 by an arrangement of eight restraining rods 27, only four being shown in FIG. 2. Two of the rods 27 extend from each corner of the frame 12 to the casing 14. One rod 27 from one corner of the frame 12 attaches to a common point on casing 14 with a rod 27 from an adjacent corner on frame 12. There are four points of support on casing 14 where the eight rods 27 attach.

The hot exhaust gases pass through the exhaust gas exit area 16. As the exhaust gas flows out the exit area 16 of the turbine 10, it heats adjacent turbine components such as the shaft 20, the outer frame 12 and the elongated struts 24 disposed across its path. The heat causes these members to expand. The position of the struts 24 causes them to be heated extensively. This causes elongation of the struts 24 and tends to axially displace the exhaust bearing 18. To maintain concentricity of the bearing 18 and the shaft 20 with respect to the turbine 10, the elongated struts 24 flex or yield, to permit axial displacement of the bearing 18, without harm to the turbine 10.

Figure 1A:
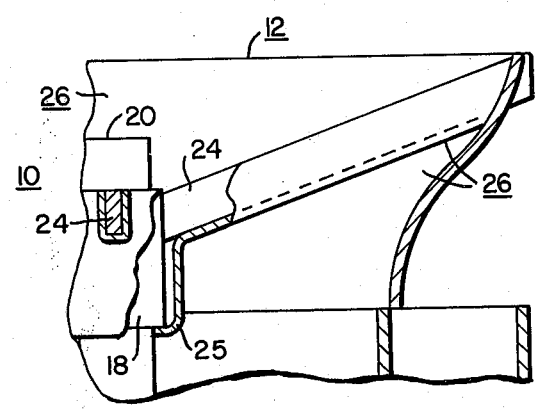
FIG. 1A is a view taken along lines IA—IA of FIG. 1.

The overall generally square shape of the outer frame 12 permits the elongated struts 24 to each be longer than half the diagonal of the square frame 12. A portion of the fairing member 26 and one of the angularly directed struts 24 are shown in FIG. 1A.

The struts 24, as shown in FIG. 2, are disposed generally obliquely with respect to the frame 12. The bearing 18 is disposed axially upstream from the frame 12. The struts 24 contact the outer surface of the bearing 18 at an acute angle. The axes of the struts 24 all pass generally through the center of the bearing 18. The struts 24, then, due to their length and obliqueness, have a flexibility and strength that would not otherwise be possible if they were of a shorter length. A larger circular frame, instead of a square the 12, would provide the length of struts desired, but this would increase the overall cross section area of the exhaust portion of the turbine. This would increase the manufacturing and shipping costs of the turbine. The arrangement of the struts 24 extending obliquely from the frame 12 upstream to the bearing 18 permits the struts 24 to be further downstream in the hot exhaust gas flow path than is the bearing 18. This permits a more complete diffusion of the exhaust gas velocity before the gas stream encounters that portion of the fairing member 26 which is disposed about the struts 24, than does the prior art.

It is thus seen that this invention provides an improved gas turbine exhaust bearing support structure that is constructed such that the thermal effects on the turbine shaft 20 and bearing 18 have minimal effect on the departure from a condition of concentricity of the shaft 20 with respect to the turbine 10. Also, this improvement is accomplished by no increase in the width and height of the shipping package of the turbine 10 and with minimal deleterious effects on the exhaust gas diffusion.

It will be understood that the invention is not limited to the specific details of the construction and arrangement of the particular embodiment illustrated and described herein. It is therefore intended to cover in the appended claims all such changes and modifications which may occur to those skilled in the art without departing from the true spirit and scope of the invention.

What is claimed and is desired to secure by letters patent of the United States is:

1. A gas turbine engine comprising:
   a rotatable shaft for supporting a rotor member,
   an outer casing generally coaxial with said shaft,
   a plurality of bearings supporting said shaft, and including at least a bearing proximate the downstream end of said shaft,
   a plurality of bearing support means obliquely disposed between the downstream end of said casing and said bearing proximate the downstream end of said shaft to maintain concentricity of said bearing during varying thermal conditions, said casing being generally cylindrical over a portion of its length and having a frame of generally square configuration on its downstream end, said frame being disposed axially downstream of said bearing which is proximate the downstream end of said shaft, and said bearing support means being comprised of four yieldable strut members, each of said four strut members extending from a corner of said square casing to points equidistant from one another on the circumference of the outer surface of said bearing.

2. A gas turbine engine as recited in claim 1 further comprising a cowling within which said strut members are disposed.

3. A gas turbine engine as recited in claim 1 wherein the axes of said obliquely disposed yieldable strut members generally pass through the center of said bearing.

4. A gas turbine engine as recited in claim 1 further comprising a plurality of restraining members for securing said frame on the downstream side of said gas turbine engine to said generally cylindrical portion of said casing of said gas turbine engine upstream of said frame.

5. A gas turbine engine as recited in claim 4, wherein said restraining members comprise restraining rod, two of said restraining rods from each corner of said frame attach to said generally cylindrical casing, and one of said restraining rods from each of two adjacent corners on said frame is secured to said generally cylindrical casing portion at a common point.

* * * * *